US008532431B2

(12) United States Patent
Hori (10) Patent No.: US 8,532,431 B2
(45) Date of Patent: Sep. 10, 2013

(54) IMAGE SEARCH APPARATUS, IMAGE SEARCH METHOD, AND STORAGE MEDIUM FOR MATCHING IMAGES WITH SEARCH CONDITIONS USING IMAGE FEATURE AMOUNTS

(75) Inventor: Shinjiro Hori, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/109,255

(22) Filed: Apr. 24, 2008

(65) Prior Publication Data

US 2008/0281797 A1 Nov. 13, 2008

(30) Foreign Application Priority Data

May 8, 2007 (JP) .................................. 2007-123665

(51) Int. Cl.
*G06K 9/36* (2006.01)
(52) U.S. Cl.
USPC ........... 382/277; 382/295; 382/298; 382/294; 707/736
(58) Field of Classification Search
USPC ................. 382/305, 151, 218, 289, 293, 294, 382/295, 298, 277; 707/705, 736
See application file for complete search history.

(56) References Cited

U.S. PATENT DOCUMENTS

| | | | | |
|---|---|---|---|---|
| 5,509,091 A | * | 4/1996 | Aoki | 382/298 |
| 5,848,201 A | * | 12/1998 | Kajiwara | 382/296 |
| 5,905,807 A | | 5/1999 | Kado et al. | 382/118 |
| 6,005,988 A | * | 12/1999 | Schroeder | 382/298 |
| 6,148,120 A | * | 11/2000 | Sussman | 382/293 |
| 6,697,539 B1 | * | 2/2004 | Dolan | 382/298 |
| 6,704,466 B1 | | 3/2004 | Yamamoto et al. | 382/305 |
| 6,813,395 B1 | * | 11/2004 | Kinjo | 382/305 |
| 6,856,707 B2 | * | 2/2005 | Enomoto | 382/277 |
| 6,885,760 B2 | | 4/2005 | Yamada et al. | 382/118 |
| 6,895,103 B2 | | 5/2005 | Chen et al. | 382/117 |

(Continued)

FOREIGN PATENT DOCUMENTS

| | | |
|---|---|---|
| JP | 2541688 | 1/1992 |
| JP | 5-197793 | 8/1993 |

(Continued)

OTHER PUBLICATIONS

Japanese Office Action dated Sep. 9, 2011 in Japanese Application No. 2007-123665.

(Continued)

*Primary Examiner* — Pierre Vital
*Assistant Examiner* — Christopher J Raab
(74) *Attorney, Agent, or Firm* — Fitzpatrick, Cella, Harper & Scinto (57) ABSTRACT

With the conventional techniques, when the images taken under various conditions such as plural aspect ratios, horizontal shooting and vertical shooting are collectively selected and searched, the search conditions adaptable to all the images can not be specified, whereby there was a problem that the search could not be made as intended. In order to solve this problem, the present invention provides an image search apparatus comprising search object image designation means for designating a search object image, search condition input means for inputting the search conditions, feature amount extraction means for extracting a feature amount thereof from the search object image, feature amount transformation means for transforming the feature amount to adapt to the inputted search conditions, and determination means for determining whether or not the search object image is matched with the search conditions using the feature amount after transformation.

9 Claims, 10 Drawing Sheets

(56) References Cited

U.S. PATENT DOCUMENTS

| | | | |
|---|---|---|---|
| 6,965,684 B2 | 11/2005 | Chen et al. | 382/103 |
| 6,999,636 B1 | 2/2006 | Enokida et al. | |
| 7,480,404 B2* | 1/2009 | Zagatsky | 382/151 |
| 7,515,754 B2* | 4/2009 | Hung | 382/218 |
| 7,676,115 B2* | 3/2010 | Komagamine | 382/293 |
| 2002/0118893 A1* | 8/2002 | Nguyen et al. | 382/294 |
| 2005/0207649 A1* | 9/2005 | Enomoto et al. | 382/190 |
| 2006/0291749 A1* | 12/2006 | Scheidhauer et al. | 382/298 |
| 2007/0071361 A1* | 3/2007 | Sanno | 382/298 |
| 2007/0242900 A1* | 10/2007 | Chen et al. | 382/294 |
| 2008/0075392 A1* | 3/2008 | Suzuki et al. | 382/295 |

FOREIGN PATENT DOCUMENTS

| | | |
|---|---|---|
| JP | 8-63597 | 3/1996 |
| JP | 8-77334 | 3/1996 |
| JP | 11-53525 | 2/1999 |
| JP | 11-250267 | 9/1999 |
| JP | 2000-076268 | 3/2000 |
| JP | 2000-105829 | 4/2000 |
| JP | 2000-132688 | 5/2000 |
| JP | 2000-235648 | 8/2000 |
| JP | 2001-084274 | 3/2001 |
| JP | 2001143080 A | 5/2001 |
| JP | 2001-216515 | 8/2001 |
| JP | 2002-183731 | 6/2002 |
| JP | 2003-30667 | 1/2003 |
| JP | 2004192121 A | 7/2004 |
| JP | 2004-318603 A | 11/2004 |
| JP | 2006-085266 A | 3/2006 |
| JP | 2006-107289 A | 4/2006 |
| JP | 2006-318034 A | 11/2006 |

OTHER PUBLICATIONS

Japanese Office Action dated Nov. 13, 2012, in corresponding Japanese Application No. 2012-024257.

* cited by examiner

IMAGE SEARCH APPARATUS, IMAGE SEARCH METHOD, AND STORAGE MEDIUM FOR MATCHING IMAGES WITH SEARCH CONDITIONS USING IMAGE FEATURE AMOUNTS

BACKGROUND OF THE INVENTION

1. Field of the Invention

The present invention relates to an image search apparatus and an image search method, and a storage medium thereof in which a feature amount for image search is inputted and an image is searched under the search conditions for the feature amount.

2. Description of the Related Art

At present, a digital camera or a portable telephone with camera has widespread, whereby the chance for taking a digital image increases. On the other hand, the storage media using a non-volatile RAM such as a CF (Compact Flash (registered trademark)) card, an SD (Secure Digital (registered trademark)) card or a memory stick (registered trademark) tends to have a larger capacity. Along with this, a greater number of images are stored in the media. Also, there is arranged a use environment in which the taken image is read into an owned PC (Personal Computer), and stored in an HDD (Hard Disk Drive) unit for browsing or printing.

Recently, the applications for supporting the image browsing or image selection operation as image management software are increasing. Some applications provide a file management function using an Exif (Exchangeable Image File Format) (registered trademark) standardized by JEIDA.

The Exif provides a function of storing the shooting information in a format of Exif Tag. With this Exif tag, the information such as shooting time, exposure amount, focal length and WB (White Balance) can be known later.

For example, a UI (User Interface) is provided through which the image can be simply searched according to the shooting time by sorting the images managed by the shooting time and linking them with the calendar.

Also, the image management software provides the user with another function of adding arbitrary tag information. With such image management software, the user can add a keyword to one or more images selected by the user. The keyword may be any string. For example, a "wedding ceremony" or an "entrance ceremony" may be inputted as the keyword.

In this manner, by adding beforehand the keyword to the image, the user can perform the search by inputting the keyword such as wedding ceremony or entrance ceremony.

However, as the number of images increases, the user has more load to add the keywords of various strings to the images, whereby it is difficult to add the keywords that can classify the images simply.

Also, when the image is searched by keyword, the keyword for specifying the image may be long or a combination of plural strings.

Figure 10:
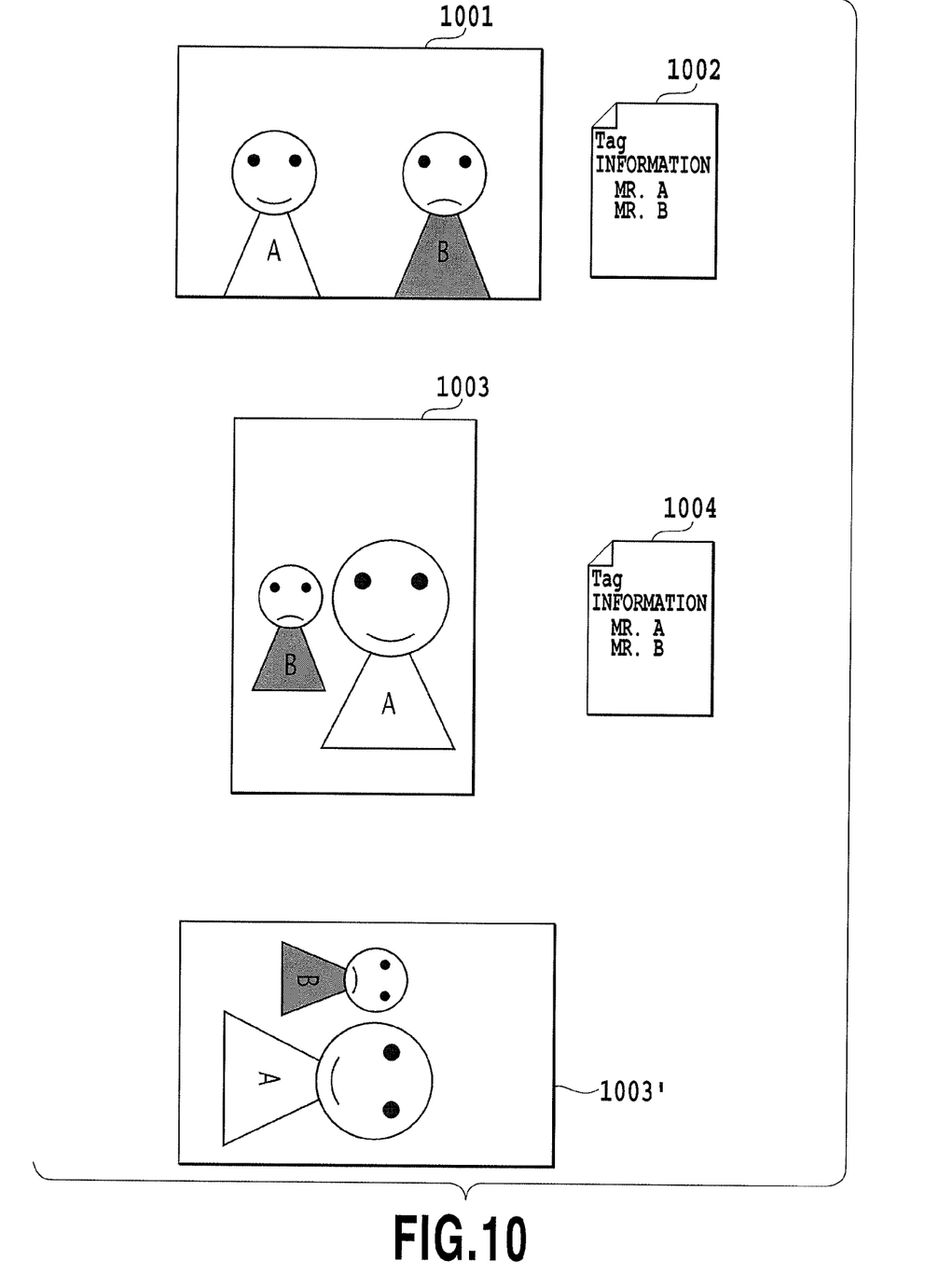
FIG. 10 is a diagram showing an example of the conventional image search by keyword.

For example, consider a case of searching and finding an image 1001 as shown in FIG. 10. The image 1001 has the keywords of "Mr. A" and "Mr. B" appended as the Tag information 1002. But the other image 1003 has also the same keywords appended as the Tag information 1004.

In such a state, if the search is made according to the keywords of "Mr. A" and "Mr. B", two images 1001 and 1003 are obtained as the search results.

However, actually, the image 1001 has Mr. A on the left side of this image and Mr. B on the right side, which are of the same size, while the image 1003 has two persons in different arrangement and face size.

Accordingly, when only the image 1001 is searched, it is required to add the detailed information regarding the composition such as "Mr. A", "Mr. B", and "Mr. A on the right side". However, it is necessary that the representation regarding the composition is systematically added even personally at the time of appending the tag. Also, when another person makes the search, the analysis itself for the keyword and the search itself can not be performed unless the way of appending the keyword is unified.

Further, if information such as the size of each face is not added to the tag, it is difficult to limit the search result.

In this manner, to search the image by keyword, it is sought to add the systematical keyword and add the detailed composition information. It is difficult for the general user to make such things steadily.

As described above, the invention for solving a problem of searching the image by keyword was disclosed in Japanese Patent Laid-Open No. 2000-076268 (hereinafter referred to as a document 1) and Japanese Patent Laid-Open No. 2001-084274 (hereinafter referred to as a document 2), for example.

The document 1 disclosed a method in which the feature amount of the image drawn by the user is obtained and the image having the high degree of similarity with the feature amount is displayed as the search result. With this method, the user can input the search conditions as illustration. Accordingly, the method can give the higher representation ability for searching than the keyword.

Also, the document 2 disclosed a method for searching the image by inputting a simple graphic such as circle, triangle or rectangle and obtaining the degree of agreement with the subject in the image.

With both the techniques as disclosed in the documents 1 and 2, the feature amount of the illustration image inputted by the user is obtained, and the image having higher degree of similarity with the feature amount is searched from an image database (hereinafter denoted as an image DB) to display the search results.

The images taken by a photographing apparatus such as a digital camera include the horizontally shot image 1001 and the vertically shot image 1003, as shown in FIG. 10. Especially in the case of the vertically shot image 1003, the user may rotate the photographing apparatus by 90° clockwise or counterclockwise in taking the image.

In the normal case, the shooting data stored as image data is generally stored as horizontally oriented data, irrespective of the orientation at the time of shooting, because the image pickup device for the photographing apparatus is mostly horizontally oriented. Accordingly, the vertically shot image 1003 is stored as the image rotated by +90° or −90° as the horizontally oriented image like the horizontally shot image 1001. FIG. 10 shows the image 1003' rotated by +90° clockwise.

Accordingly, when the image search is performed by the method as disclosed in the document 1 or 2, there is a problem that the desired result can not be obtained only by directly applying the conditions inputted by the user to the image data.

That is, even if the search conditions are inputted at an aspect (length-to-width) ratio of the image limited in the case of searching the image where two persons sit side by side, the images 1001 and 1003' can not be searched at the same time. Also, when the image 1003' is rotated into alignment in the upper, lower, left and right, and stored as the image 1003, these three images can not be searched.

With these conventional methods, when the images taken under various conditions such as plural aspect ratios, horizontal shooting and vertical shooting are collectively selected and searched, the search conditions adaptable to all the images can not be specified, whereby there was a problem that the search can not be made as intended.

SUMMARY OF THE INVENTION

Thus, in order to solve the above-mentioned problems, an image search apparatus and an image search method and its storage medium according to the invention have the following constitution.

In the first aspect of the present invention, there is provided an image search apparatus comprising search object image designation means for designating a search object image, search condition input means for inputting the search conditions, feature amount extraction means for extracting a feature amount from the search object image, feature amount transformation means for transforming the feature amount to be adaptable to the inputted search conditions, and determination means for determining whether or not the search object image is matched with the search conditions using the feature amount after transformation.

In the second aspect of the present invention, there is provided an image search method for use in an image search apparatus, the method comprising a search object image designation step of designating a search object image, a search condition input step of inputting the search conditions, a feature amount extraction step of extracting a feature amount from the search object image, a feature amount transformation step of transforming the feature amount to be adaptable to the inputted search conditions, and a determination step of determining whether or not the search object image is matched with the search conditions using the feature amount after transformation.

In the third aspect of the present invention, there is provided a computer readable storage medium storing a program for performing an image search method on a computer, the method comprising a search object image designation step of designating a search object image, a search condition input step of inputting the search conditions, a feature amount extraction step of extracting a feature amount from the search object image, a feature amount transformation step of transforming the feature amount to be adaptable to the inputted search conditions, and a determination step of determining whether or not the search object image is matched with the search conditions using the feature amount after transformation.

With the invention, it is possible to provide an image search apparatus or method capable of making the search by designating the search conditions at one time, when the images taken under various conditions such as plural aspect ratios, horizontal shooting and vertical shooting are collectively selected for the search.

Further features of the present invention will become apparent from the following description of exemplary embodiments (with reference to the attached drawings).

DESCRIPTION OF THE EMBODIMENTS

The preferred embodiments of the present invention will be described below with reference to the accompanying drawings.

<First Embodiment>

Figure 1:
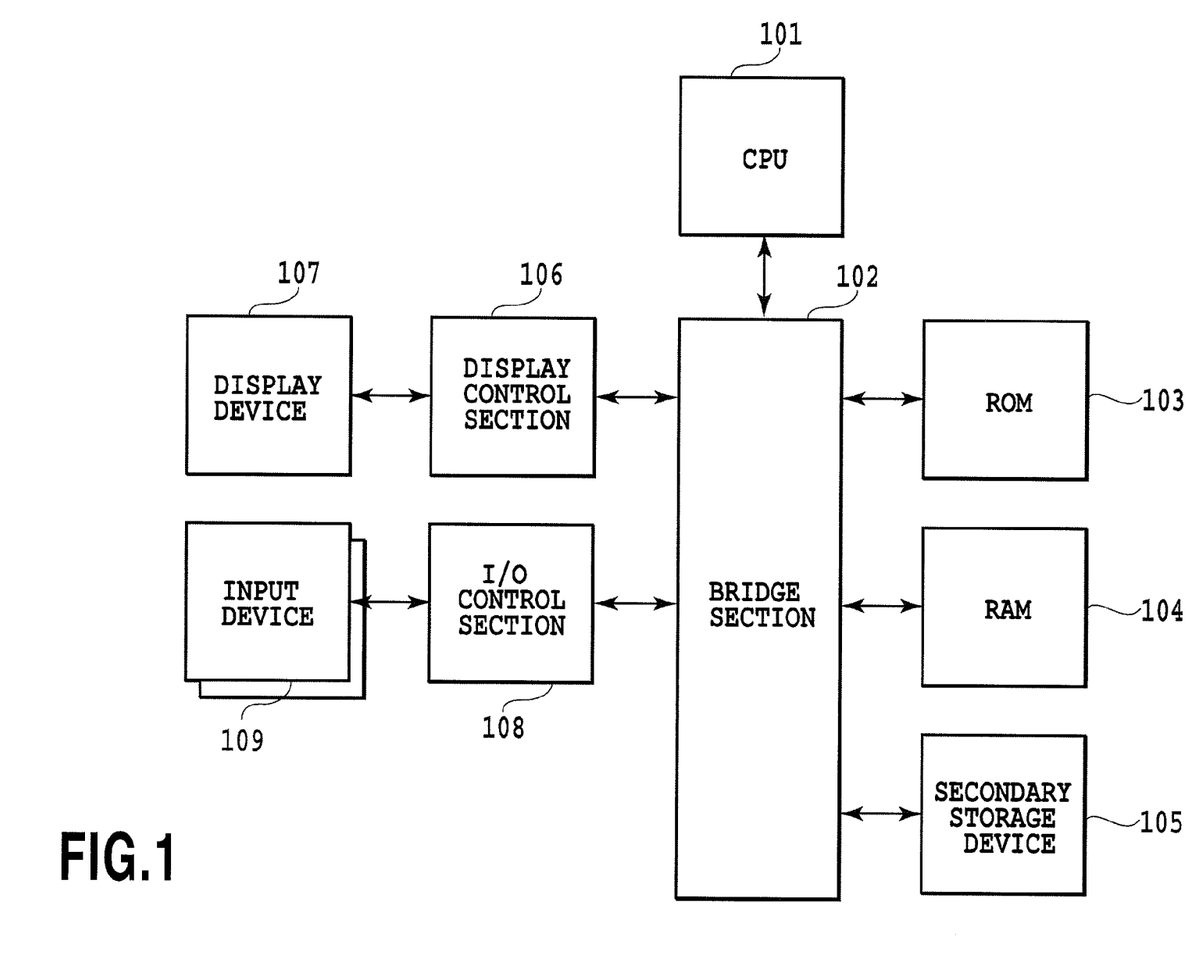
FIG. 1 is a block diagram of an image search apparatus of an embodiment in accordance with the present invention.

FIG. 1 shows a block diagram of an image search apparatus of an embodiment in accordance with the present invention.

Though it is supposed here that a PC is employed as the image search apparatus for the explanation, one or more general-purpose computers or dedicated devices other than the PC may be employed. In the following, the image search will be described in which the conditions for searching the image include the person, especially face that is one of the main subjects for photograph.

A CPU 101 is a central processing unit (Central Processing Unit) for controlling the other functional blocks or devices. A bridge section 102 provides a function of controlling the exchange of data between the other functional blocks and the CPU 101.

A ROM (Read Only Memory) 103 is a read only non-volatile memory, in which a program called a BIOS (Basic Input/Output System) is stored. The BIOS is the program firstly executed when the image search apparatus is started, and controls the peripheral devices such as a secondary storage device 105, an output device 107 and an input device 109.

A RAM (Random Access Memory) 104 provides a high speed readable/writable storage area.

The secondary storage device 105 is an HDD that provides a large capacity of storage area. If the BIOS is performed, an OS (Operating System) stored in the HDD is executed. The OS provides the basic functions available on all the applications, the management of applications and a basic GUI (Graphical User Interface). The application can provide a UI for implementing the specific functions of application itself by combining the GUIs provided by the OS. The executable program for the OS or other applications or working data is stored in the RAM 104 or the secondary storage device 105, as needed.

A display control section 106 performs the control for displaying the image data of GUI generated as the result of a user' operation on the OS or application on the display device 107. The display device 107 may be a liquid crystal display or a CRT (Cathode Ray Tube) display.

An I/O control section 108 provides an interface with a plurality of input devices 109. The typical interfaces include a USB (Universal Serial Bus) and a PS/2 (Personal System/2).

An input device 109 such as a keyboard or a mouse inputs an instruction on the user's will into the image search apparatus. Further, it may transfer image data by connecting to a digital camera or a storage device such as a USB memory from them.

Figure 2:
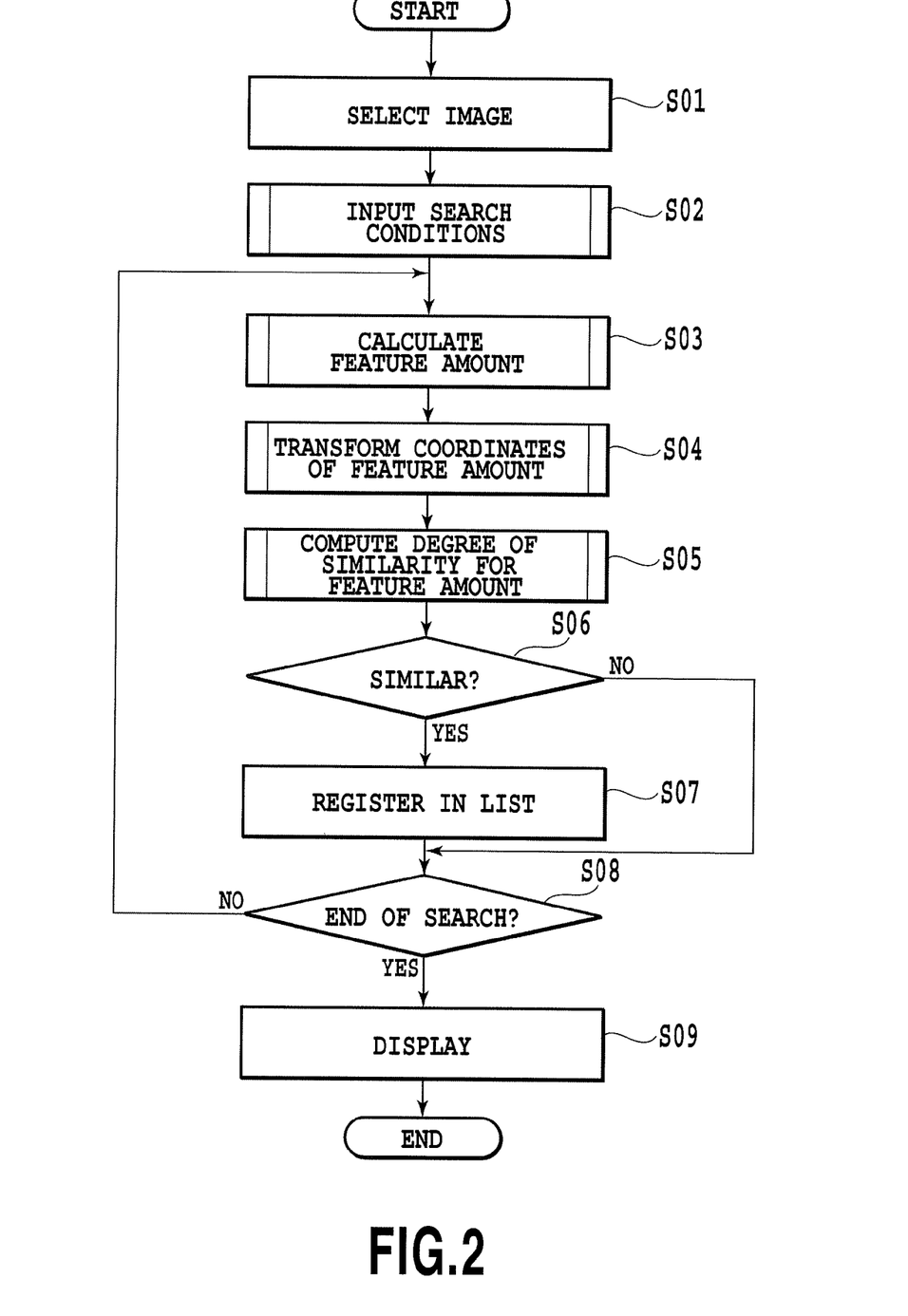
FIG. 2 is a flowchart for image search in the first embodiment.

FIG. 2 shows a flowchart of an embodiment in accordance with the present invention.

The case that an image search function of the image search apparatus according to this embodiment is provided as one function of a GUI for application will be described bellow. Therefore, an instruction of the user is inputted from the input device 109 such as a mouse or a keyboard, whereby an interactive operation is enabled. A processing flow as shown in FIG. 2 is one example of flow when the user searches the image, but actually because of the interactive operation, an instruction of returning to the beginning from the middle of the flow may be made. To simplify the explanation here, a typical operation flow will be only described below.

Figure 3:
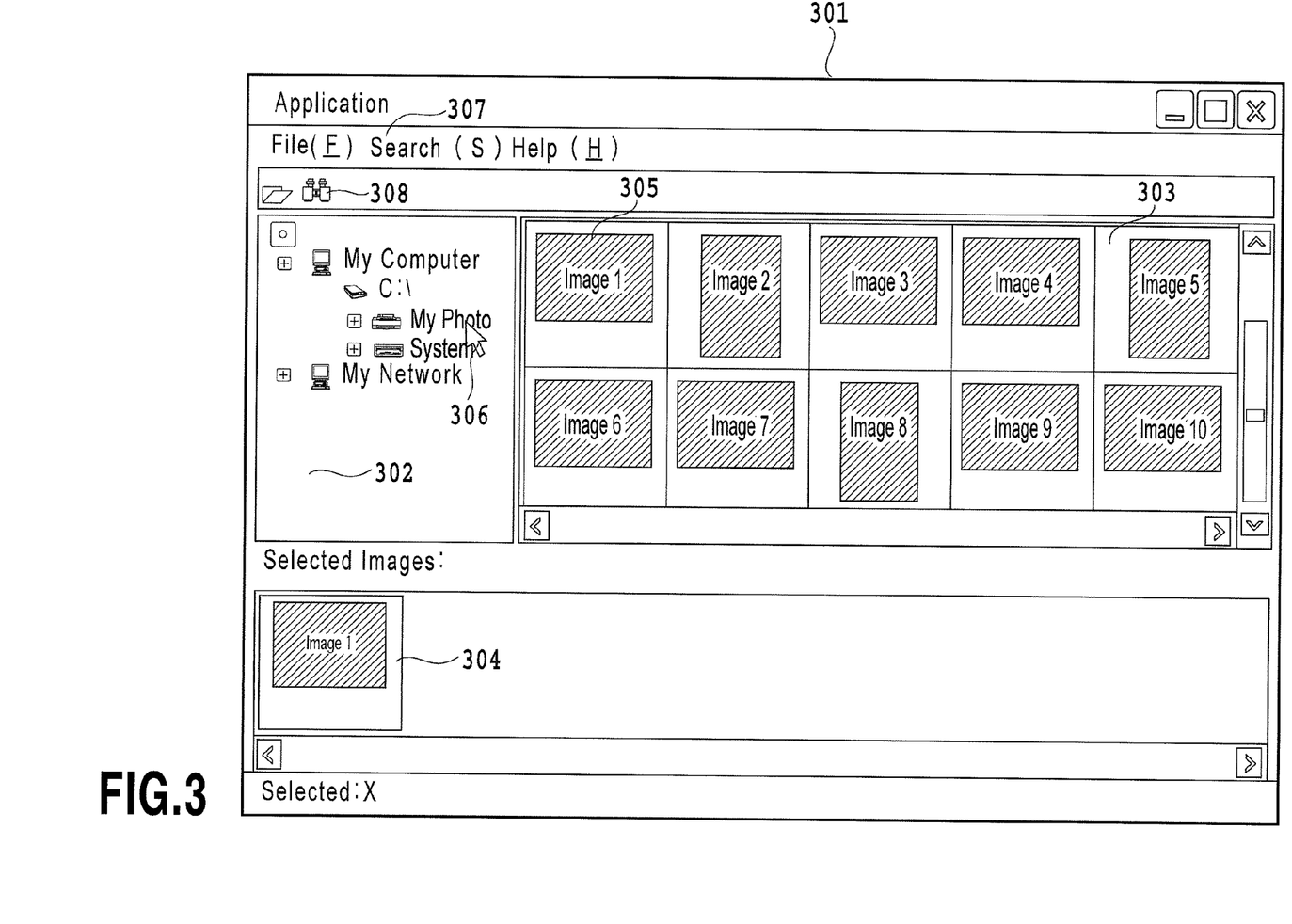
FIG. 3 is a diagram showing one example of a UI for an image search application in the first embodiment.

FIG. 3 shows a UI at the time of starting an image search application 301 performed by the image search apparatus. Referring to FIG. 3, an operation of selecting an image at an image selection step of S01 in FIG. 2 will be firstly described below.

The image search application 301 (search object image designation means) is composed of three areas for a folder selection UI 302, an image list UI 303 and a selected image list UI 304. A pointing UI 306 (a so-called pointer) is a UI, which can move in accordance with an operation of the input device 109 such as a mouse, and input a user's operation into the image search application 301.

The folder selection UI 302 provides a function of selecting a store location of image data stored in the image search apparatus. In FIG. 3, a certain store location is designated by the pointing UI 306.

The image list UI 303 displays a list of image data at the store location selected by the folder selection UI 302. The selected image list UI 304 is an area only for displaying the image selected by the user or the image searched according to the designation of the user.

If the user selects a desired folder in the folder selection UI 302 by moving the pointing UI 306 at S01, a list of image stored within the folder is displayed in the image list UI 303.

If the desired image for the next processing object without search is selected by the pointing UI 306, the selected image is displayed in the selected image list UI 304. For example, if Image1 305 is selected, Image1 305 is displayed in the selected image list UI 304. At this time, Image1 305 is internally registered as the object image for the next processing in the list. Though not displayed, a button for selecting all the images within the folder may be prepared. Also, a different folder may be designated to additionally select the image in the folder.

However, in performing the search as will be described later, a plurality of folders are firstly selected. If the selection is completed, the processing moves to the step S02 at which the search conditions are inputted. To move to the step of the search condition input, a search menu 307 or a search button 308 for the search application 301 is selected, so that a search dialog 401 (i.e. a display element of search condition input means) appears as shown in FIG. 4.

Herein, it is supposed that the main subject to be noticed in searching the image is the person's face in the continuing explanation. The person's face is one of the subjects with the highest frequency of shooting in the photographs. Accordingly, in searching the image, the very effective search conditions may include whether the person exists in the image, how many persons there are and where the person exists in the image.

Figure 4A:
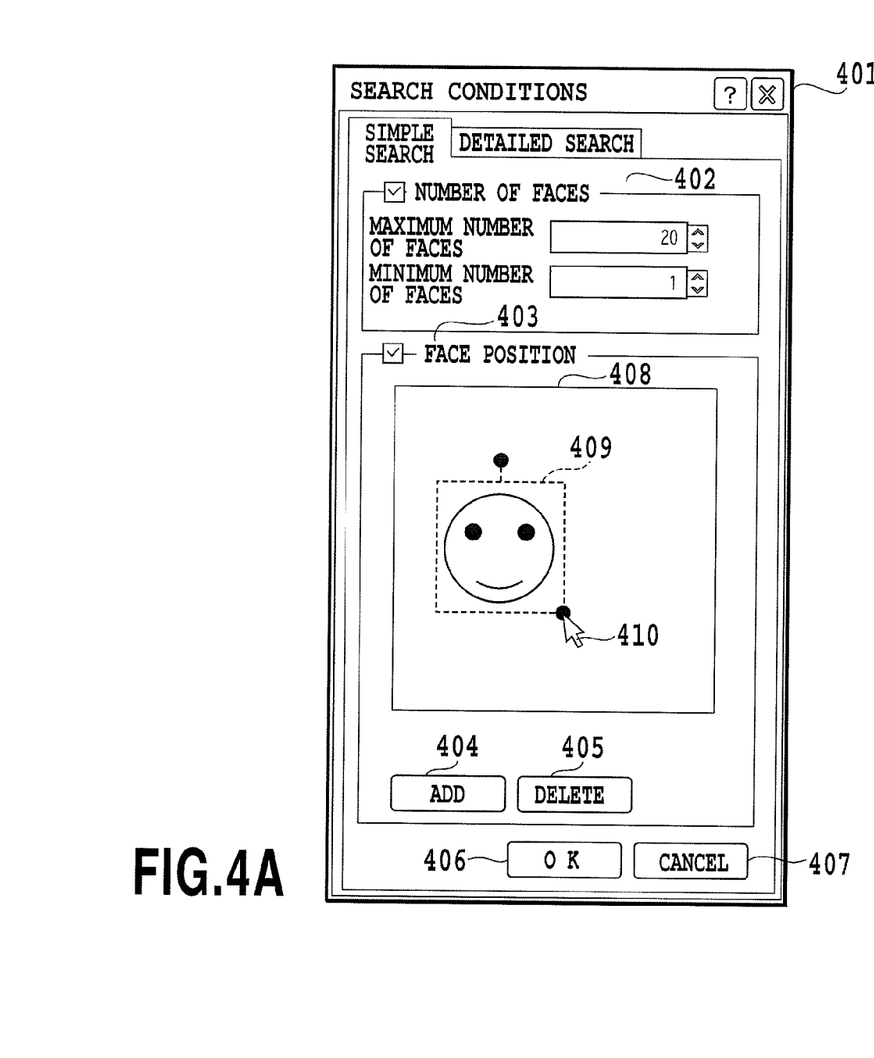
FIG. 4A is a diagram showing one example of the UI for a search condition input dialog and a search condition input coordinate system in the first embodiment.

Referring to FIG. 4, an input method for the search conditions performed at S02 in FIG. 2 will be described below.

In the search dialog 401, the number of faces 402 and the face position 403 can be designated. If the check box for the number of faces 402 is checked, the number of faces existent in the image can be designated. Herein, if the maximum number of faces and the minimum number of faces are inputted, the condition satisfying Minimum number of faces≦Number of faces in the image≦Maximum number of faces can be set up.

Next, if the check box for the face position 403 is checked, the face position can be designated. If an additional button 404 is selected, a face icon 409 appears in a face position input area 408. The face icon 409 can be selected by the pointing UI 410 to change the position in the face position input area 408.

If the additional button 404 is selected plural times, a plurality of face icons 408 can be set up. Also, the face icon 408 which is supposedly unnecessary may be selected by the pointing UI 306 and removed from the face position input area 408 by selecting a delete button 405.

Further, a face icon 501 has two clip points 502 and 503, as shown in FIG. 5. A clip point 502 is used to adjust the size of the face icon 501. A clip point 503 is used to adjust the inclination of the face icon 501.

Figure 5A:
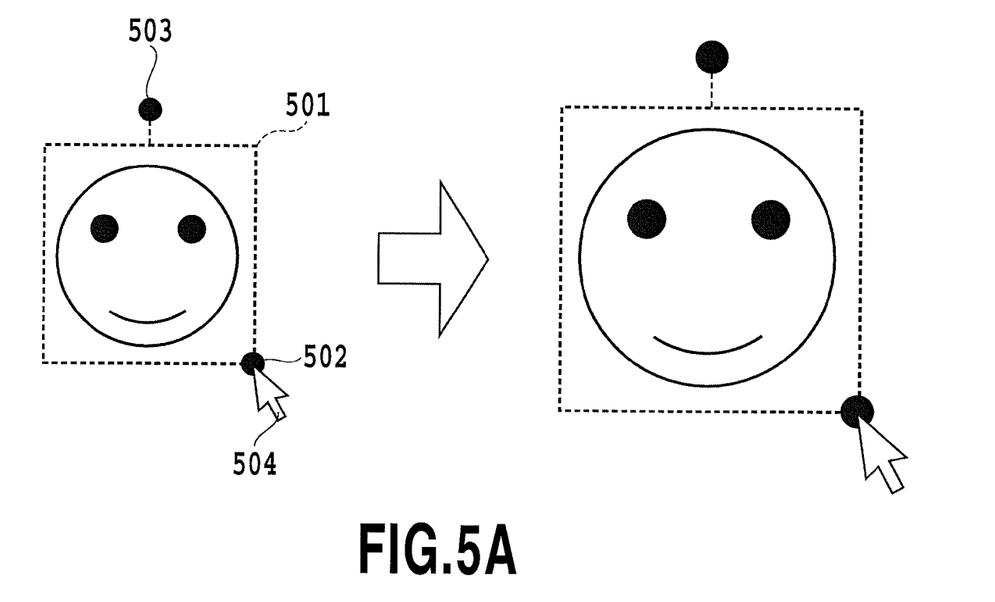
FIG. 5A is a diagram for explaining a method for changing a face icon in the first embodiment.
Figure 5B:
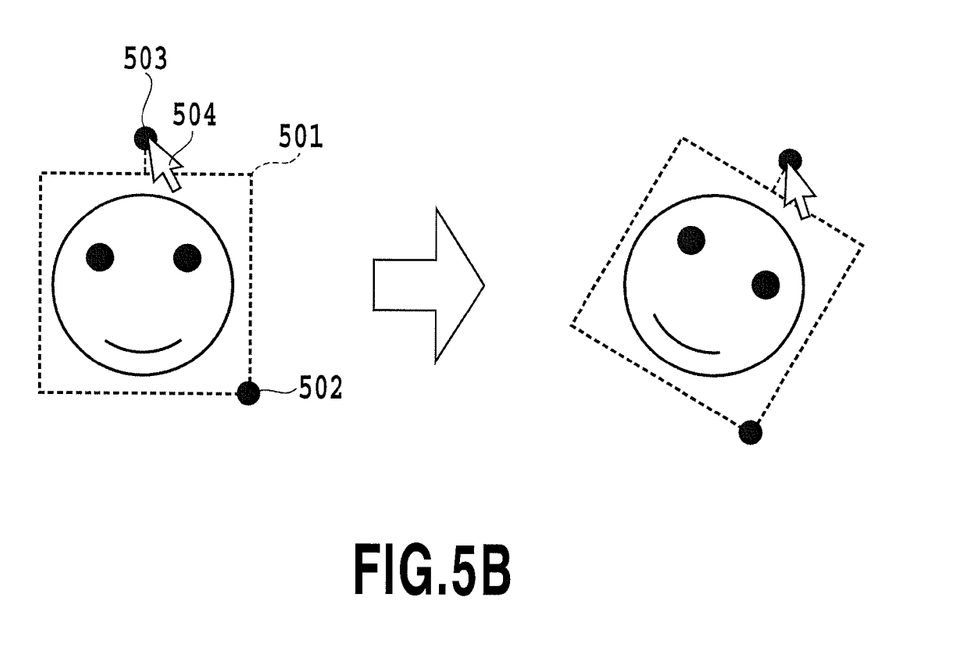
FIG. 5B is a diagram for explaining the method for changing the face icon in the first embodiment.

FIG. 5A shows how the face icon 501 is enlarged by selecting the clip point 502 with the pointing UI 504 and moving the pointing UI 504 right downward. Similarly, FIG. 5B shows how the face icon 501 is rotated clockwise by selecting the clip point 503 with the pointing UI 504 and moving the pointing UI 504 obliquely right downward.

Figure 4B:
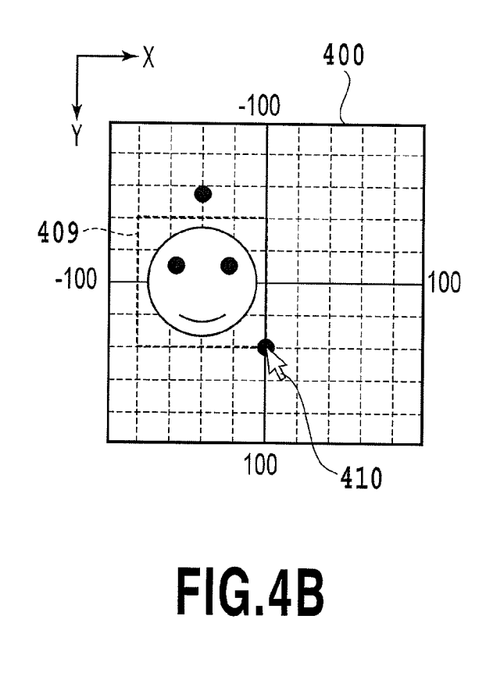
FIG. 4B is a diagram showing one example of the UI for the search condition input dialog and the search condition input coordinate system in the first embodiment.

By providing the functions as described above, it is possible to simply specify such complex search conditions for the image that the faces of designated size exist on the left in the image, with the number of faces being from 1 to 20, for example, as shown in FIG. 4B.

In the face position input area 408, a coordinate system as indicated at 400 is defined. This coordinate system has the origin at the center point (x,y)=(0,0) on the screen, where the upper side y=−100, the lower side y=100, the left side x=−100, and the right side x=100.

Accordingly, the face designated by the face icon 409 has the center (x,y)=(−60,0), in which the size of face is 80 and the inclination is 0°. Herein, the size of face means the length of one side in the rectangular area of the face icon 409. The rotation angle is defined to be positive in the clockwise direction with reference to the upper direction on the paper of FIG. 4.

If all the specifications are ended, an OK button 406 is selected to settle the conditions, and the operation goes to S03. Also, if a Cancel button 407 is selected, the designation of the search conditions is canceled, and the operation can return to S01.

Next, the feature amount of the main subject included in the search object image selected at S01 is calculated at S03 (feature amount extraction step) in FIG. 2. Herein, the feature amount means the position, size and inclination of face in the image designated at S02.

Various methods for detecting the face in the image have been conventionally proposed. For example, there is an invention as disclosed in Japanese Patent Laid-Open No. 2002-183731 by the present applicant. With this invention, an eye area is detected from an input image, and the peripheral part around the eye area is made a face candidate area. And for this face candidate area, the gradient of gradation distribution for each pixel and the weight based on the gradient of gradation distribution are calculated. Using these values, the gradient of gradation distribution for the ideal preset face reference image and the weight based on the gradient of gradation distribution, the face candidate area and the face reference image are compared. A method for judging that the input image has the face area if the mean value of angle between these gradients or the weighted mean value is less than or equal to a predetermined threshold is described.

Also, in Japanese Patent Laid-Open No. 2003-30667, first of all, a flesh color area is detected from the image, and the iris color pixel of the human is detected in the same area, whereby the position of the eye can be detected.

Further, in Japanese Patent Laid-Open No. 8-63597, the matching degrees of the image with a plurality of templates having the facial shape are calculated, and the template having the highest matching degree is selected. And if the highest matching degree is greater than or equal to a predefined threshold, an area within the selected template is made the face candidate area. In this manner, the position of the eye can be detected using the above template.

Further, in Japanese Patent Laid-Open No. 2000-105829, first of all, a nose image pattern is prepared as the template, and the entire image or a designated area of the image is scanned, whereby the most matched position is outputted as the position of nose. Considering an area above the position of nose as the area where the eye exists, an eye existent area is scanned and matched with an eye image pattern as the template, and then an eye existent candidate position set that is a set of pixels having greater matching degree than a certain threshold is obtained. Further, a consecutive area included in the eye existent candidate position set is divided into clusters, and the distance between each cluster and the nose position is calculated. The cluster having the shortest distance is decided as the cluster where the eye exists, whereby the organ position of person's face can be detected.

Besides, various methods for detecting the face and the organ position in the face have been proposed. For example, some methods are proposed in Japanese Patent Laid-Open No. 8-77334, Japanese Patent Laid-Open No. 2001-216515, Japanese Patent Laid-Open No. 5-197793, and Japanese Patent Laid-Open No. 11-53525. Also, other methods are proposed in Japanese Patent Laid-Open No. 2000-132688, Japanese Patent Laid-Open No. 2000-235648, Japanese Patent Laid-Open No. 11-250267, and Japanese Patent No. 2541688. In the present invention, any of those methods may be employed. Also, the method for detecting the face and the organ position in the face is not limited to those as described above, and any other method may be employed. Since the conventional methods for detecting the face and the organ position in the face are disclosed in various literatures and patents, the detailed explanation is omitted.

The number of person's faces and the coordinates of the face area in the original image data are obtained by the above methods, and the face coordinate data of the detection result is obtained. Herein, it is supposed that the face area is a rectangular area as the detection result and the coordinates of four vertexes are outputted. The face detection is performed for the images selected at S01 in FIG. 2, whereby the face detection result is stored. Two or more face detection results may be obtained. As a matter of course, the face coordinates detected at S01 are the coordinates in each selected image. Thus, it is required that the coordinates are associated with the coordinate system for the face position input area 408 designated in the search dialog 401 as used at S02.

Figure 6:
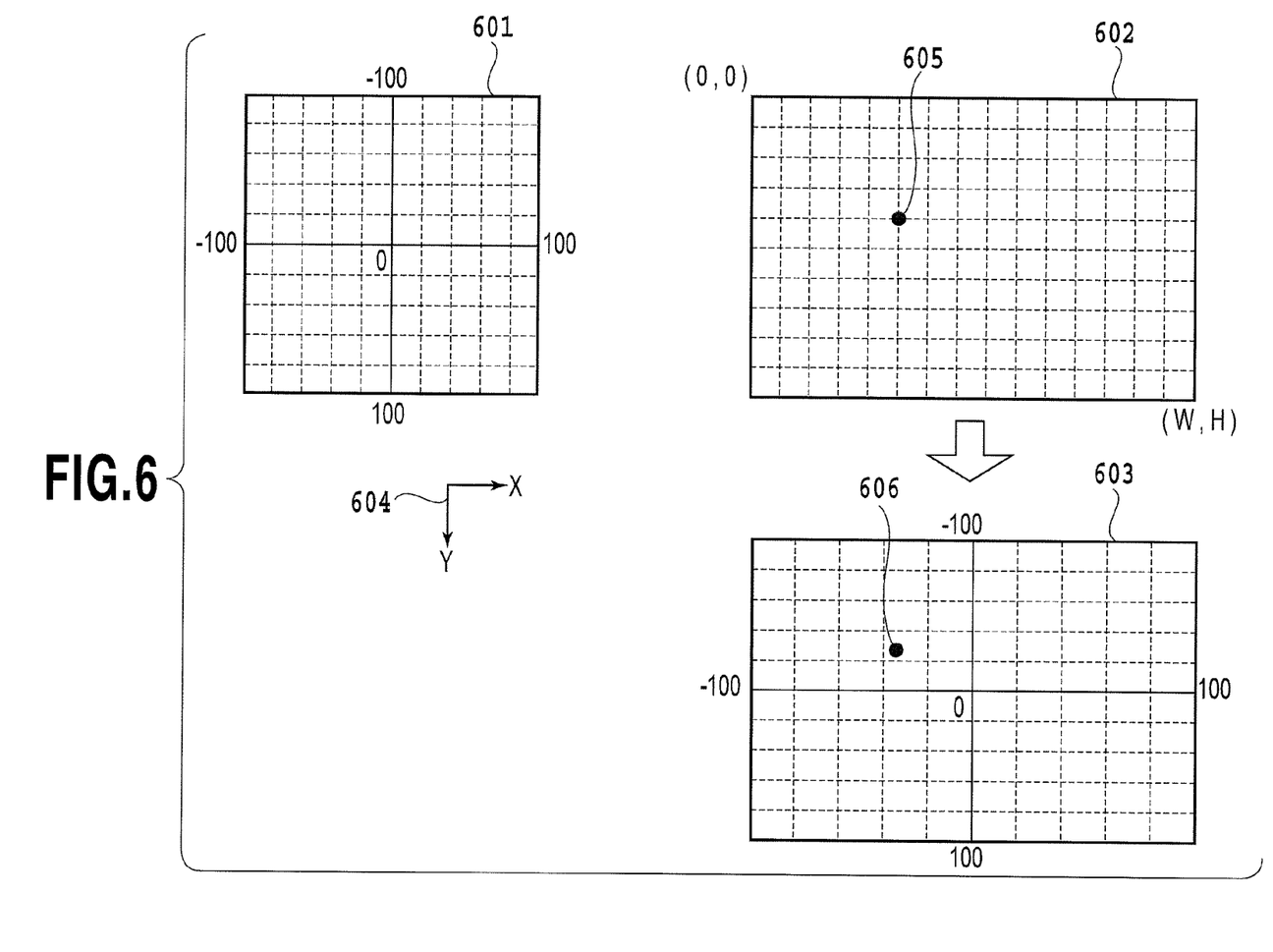
FIG. 6 is a diagram for explaining the transformation of an image coordinate system in the first embodiment.
Figure 7:
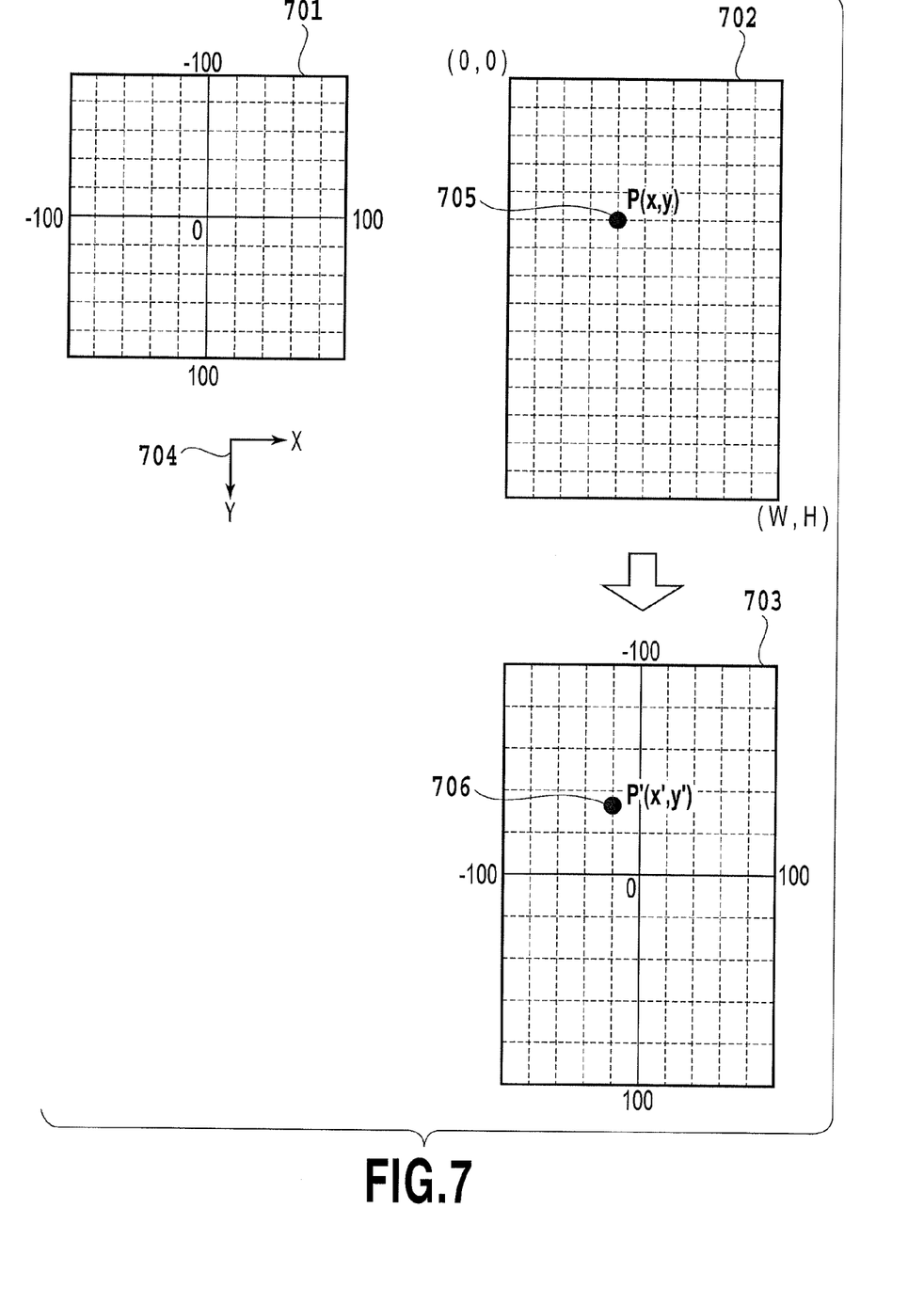
FIG. 7 is a diagram for explaining the transformation of the image coordinate system in the first embodiment.

Therefore, at S04, a processing for transforming the face detection coordinates detected at S03 into the coordinate system for the face position input area 408 is performed to adapt to the search conditions. Referring to FIGS. 6 and 7, the transformation method will be described below.

FIG. 6 is an example of a horizontally oriented image, and FIG. 7 is an example of a vertically oriented image. They are represented in two dimensions, and have the coordinate axes X and Y in the directions as indicated at 604 and 704 respectively. The coordinate systems 601 and 701 are coordinate systems for the search dialog 401. The coordinate systems 601 and 701 have the origin at the center, and can take the values of x and y from −100 to 100.

The coordinate systems 602 and 702 have the numbers of pixels W and H horizontally and vertically. The coordinate systems 602 and 702 have the origin (0,0) at the upper left point and can take the values up to the lower right point (W,H). The coordinate systems 603 and 703, like the coordinate systems 601 and 701, have the origin at the center, and can take the values of X and Y from −100 to 100, in which the image is fitted in the coordinate system.

Any point P(x,y) in the coordinate systems 602 and 702 is represented by the point P'(x',y') in the coordinate systems 603 and 703 which is relatively at the same position. A transformation expression at this time is an expression (1) for x and an expression (2) for y as follows.

[Expression 1]
$$x' = \frac{200}{W} \times x - 100 \tag{1}$$

[Expression 2]
$$y' = \frac{200}{H} \times y - 100 \tag{2}$$

Using the transformation expressions (1) and (2), the coordinate values of all the faces detected at S03 are transformed.

At S05, the degree of similarity between the search conditions specified at S02 and information obtained from the coordinates of the faces transformed at S04 is computed. The search conditions include the number of faces existent in the image (value designated by the number of faces 402) and the coordinate value of the face icon 409 (designated by the face position 403). Herein, a plurality of face icons 409 may be designated.

At first, it is determined whether or not the number of faces detected at S03 satisfies the number of faces designated at S02. If this condition is satisfied, the degree of similarity between the coordinates of all the face detection results and the coordinates of the face icon 409 is computed. The degree of similarity can be computed using the sum of distances between four vertexes of the face icon 409 and corresponding four vertexes of the face detection results, or the degree of agreement in the central points, the sizes of the rectangles and the angles (inclinations) of the rectangles computed respectively from the four vertexes of the face icon 409 and corresponding four vertexes of the face detection results.

At S06, it is determined whether or not the number of faces satisfies the condition and there is any face determined to be similar. That is, it is determined whether or not the feature amount after transformation is matched with the search conditions. The determination is made by deciding beforehand a predetermined threshold and comparing its value with the degree of similarity computed at S05. Herein, if there is any face with the degree of similarity exceeding the threshold, the processing goes to S07, where the image is registered in the list. On the other hand, if not, the processing goes to S08.

At S08, it is determined whether or not all the images selected at S01 are processed. If all the images are not processed, the processing goes to S03 to process the next image. If all the images are processed, the processing goes to S09, whereby the search results so far obtained are displayed on the display device 107.

The display of the search results can be implemented by updating the display of the selected image list UI 304 in the image search application 301. At this time, the results displayed in the selected image list UI 304 can be displayed in descending order of the degree of similarity by sorting the search results based on the degree of similarity at S07.

While the image search apparatus with the person's face as the search conditions has been described above, other search conditions may be employed. For example, a personal recognition method for recognizing the person may be adopted, whereby the search with higher added value is enabled. In the case of employing the personal recognition, when the face icon 409 is added by the addition button 404 at S02, a plurality of face icons 409 linked with the person may be pre-selected, and the icon for the person to be searched from them may be designated.

Also, any body (object) as the noticed subject, not limited to the face or person, may be designated. For example, a car and a building may be considered. Using a detector or a detection method for detecting each object, the search can be made in the same manner as for the face.

Also, some kinds of photographing apparatuses can detect the inclination at the time of shooting and write it in Exif Tag. This Tag information is called Orientation. By analyzing this information, the image data can be aligned in the upper, lower, left and right directions and displayed. At the time of search, if the user chooses whether or not to use this information, the search can be made under the consistent search conditions without regard to the image direction.

In the image search apparatus of this embodiment, the search results may not be intended by the user, after S09 where the image search results are displayed under the search conditions inputted at S02. At this time, to make better the search results, a narrowing search may be provided. The narrowing search is a method for making the search by further adding the search condition to the search results. The search dialog 401 may be provided with a check box of the narrowing search, not shown, and the search conditions may be added or modified by adding the face detection icon 409 or changing the designation of the number of faces 402 and the like. Thereafter, the search may be performed again for the image with the previous search results, and repeated until the intended search results are obtained.

At this time, a search assist function of displaying an auxiliary message such as "Is the number of faces matched?" or "Is the face direction matched?" if the narrowing search check box, not shown, is checked may be provided. Also, though the coordinate values of the faces detected at S03 are transformed in the above embodiments other way round, the coordinate value of the face icon 409 may be transformed, and the degree of similarity between the coordinate values of the faces detected at S03 and the transformed coordinates of the face icon 409 may be computed.

<Other Embodiments>

In the first embodiment as described above, the photographed image including the noticed subject is searched from the photographed images having different aspect ratios, in which the face icon 409 is arranged in the face position input area 408 with the fixed aspect ratio so that the search conditions can be inputted. However, the X and Y axes of the image are aligned at the aspect ratio of the face position input area 408, whereby the scale up and down ratios along the X and Y axes may be different. Accordingly, the coordinates are consistent at only the center point, and may be necessarily shifted in the other areas.

Figure 8:
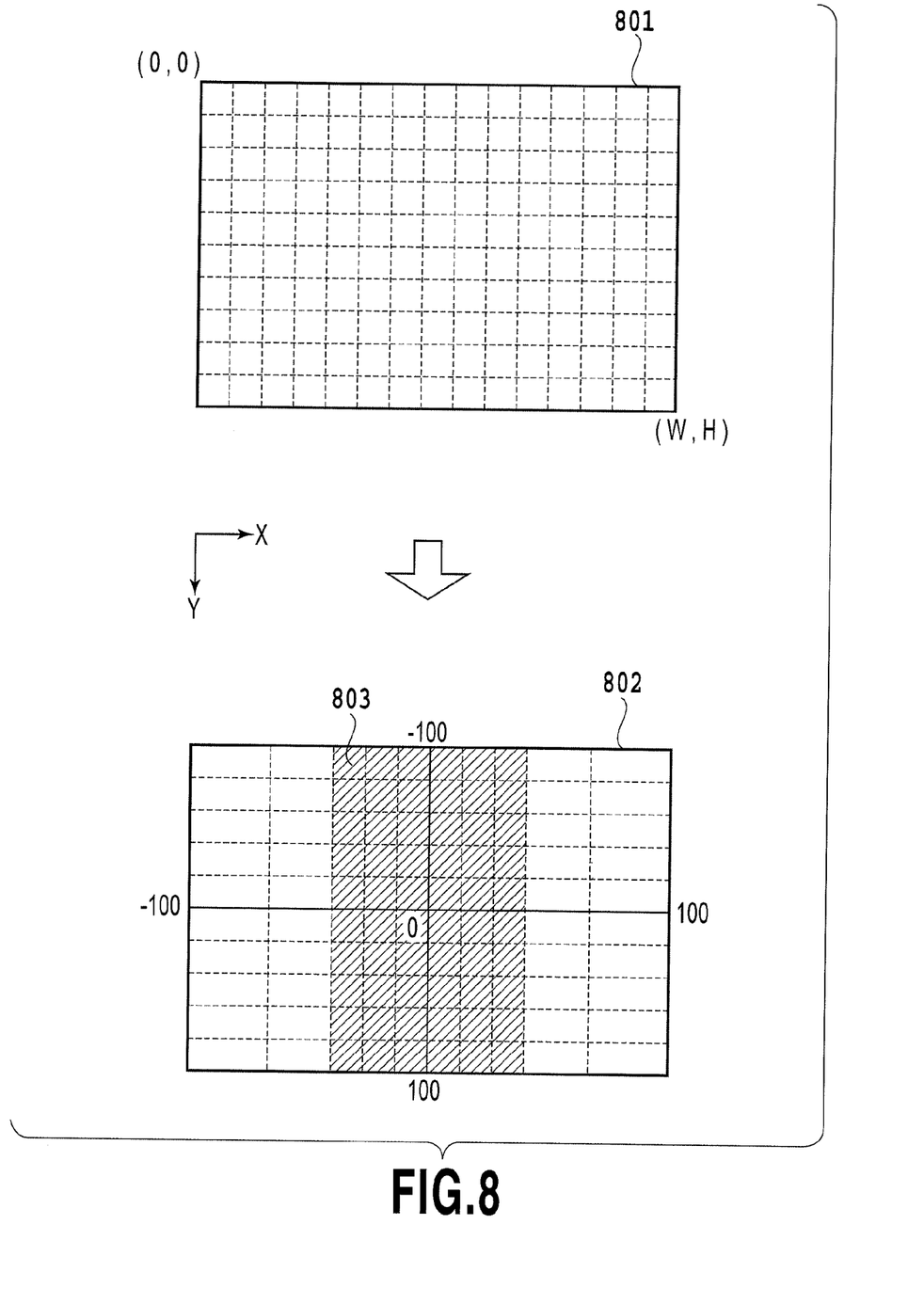
FIG. 8 is a diagram for explaining the transformation of the image coordinate system in the first embodiment.

Generally, even with the specifications of such search conditions that the search precision is high near the center and rough on the periphery, they do not have a practical problem. Therefore, in another embodiment, the search conditions can be inputted more effectively by making the coordinate transformation as shown in FIG. 8.

A coordinate system 801 of the above image is the coordinate system for the image in which the numbers of pixels in width and length are W and H respectively. This coordinate system 801 has the origin (0,0) at the upper left point and can take the values up to the lower right point (W,H).

The image coordinate system 801 is transformed into a coordinate system 802 that has the origin at the center and can take the values of X and Y from −100 to 100, like the coordinate system for the search dialog 401.

In the coordinate system 802 after transformation, the image is transformed for the smaller one (short side direction) of the horizontal and vertical numbers of pixels as in the first embodiment. In FIG. 8, since the vertical number of pixels is smaller than the horizontal number of pixels, the coordinates for the Y axis are transformed in accordance with the expression (2).

On the other hand, the interval of coordinates in the X axis direction that is the long side direction with greater number of pixels is transformed into the same coordinate interval as the Y axis within a predetermined range (herein ±60) In FIG. 8, the range corresponds to an area 803. Outside this area, the interval is wider toward the periphery, and ±100 at both ends. The relationship between x before transformation and x' after transformation is represented by the following expressions (3), (4) and (5).

[Expression 3]
$$x' = \frac{40}{\frac{(W-0.6H)}{2}} \times x - 100 \left(0 < x \leq \frac{W-0.6H}{2}\right) \quad (3)$$

[Expression 4]
$$x' = \frac{200}{H} \times \left(x - \frac{W-0.6H}{2}\right) - 60 \left(\frac{W-0.6H}{2} < x \leq \frac{W+0.6H}{2}\right) \quad (4)$$

[Expression 5]
$$x' = \frac{40}{\frac{(W-0.6H)}{2}} \times \left(x - \frac{W+0.6H}{2}\right) + 60 \left(\frac{W+0.6H}{2} < x \leq W\right) \quad (5)$$

Figure 9:
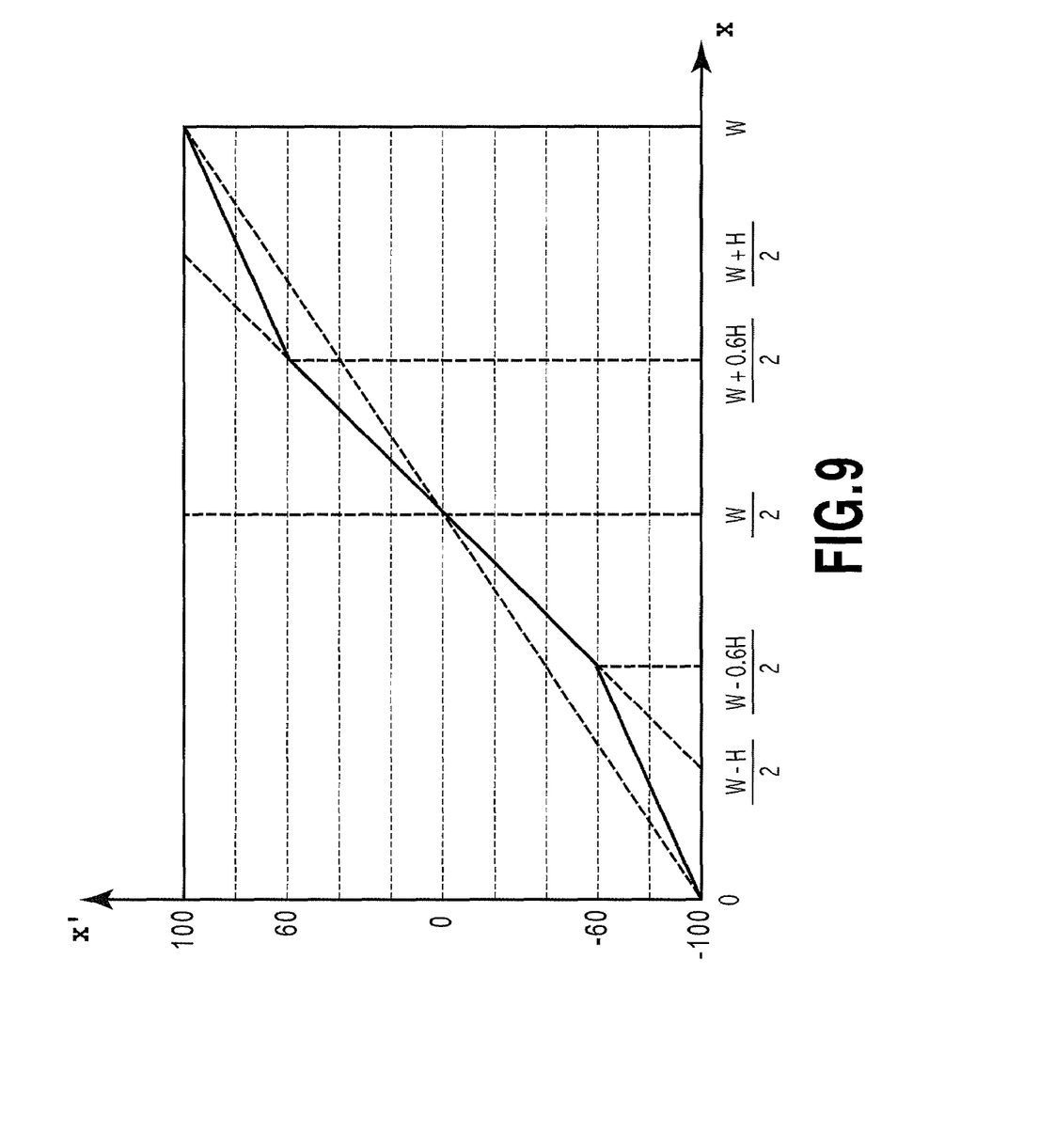
FIG. 9 is a diagram for explaining the transformation of the image coordinate system in the first embodiment.

FIG. 9 illustrates a graph showing the correspondence between x and x' at this time. In this manner, through such a transformation of making the equal magnification in length and width near the center of the coordinate system and the variable magnification near the ends, it is possible to provide an environment where the search conditions can be easily inputted intuitively, even if the aspect ratio of the face position input area 408 and the aspect ratio of the image to be searched are different. As a matter of course, in the case of the vertically oriented image, the transformations for the X axis and the Y axis may be exchanged.

Also, in determining the degree of similarity at S06, the tolerance of determination is made greater toward the periphery, namely, the determination for differences is loosened when the specified search conditions are compared with the feature amounts such as the position, size and angle of face as previously described. Thereby, the search is possible in consideration of input errors of the search conditions which are greater toward the periphery.

The object of the present invention is achieved by causing a computer (or CPU or MPU) of the system or apparatus to read and execute a program code from a storage medium storing the program code for implementing a procedure of the flowchart as shown in the above embodiments. In this case, the functions of the above embodiments can be implemented by the program code read from the storage medium. Therefore, this program code and the computer readable storage medium recording or storing the program code may constitute one of the present inventions.

The storage medium for supplying the program code may be a floppy disk, a hard disk, an optical disk, an optical magnetic disk, a CD-ROM, a CD-R, a magnetic tape, a nonvolatile memory card or a ROM, for example.

Also, the functions of the above embodiments can be implemented by executing the read program code on the computer. Also, the execution of the program may include a case where an OS or the like operating on the computer performs a part or all of the actual processing, based on the instructions of the program code.

Moreover, the functions of the above embodiments can be also implemented using a function extension board inserted into the computer or a function extension unit connected to the computer. In this case, first of all, the program read from the storage medium may be written into a memory provided for the function extension board inserted into the computer or the function extension unit connected to the computer. Thereafter, a CPU or the like equipped on the function extension board or function extension unit may perform a part or all of the actual processing, based on the instructions of the program. The functions of the above embodiments can be also implemented through the processing of the function extension board or function extension unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-123665, filed May 8, 2007, which is hereby incorporated by reference herein in its entirety.

What is claimed is:

1. An image search apparatus comprising:
   search object image designation means for designating search object images;
   search condition input means for inputting search conditions;
   for each designated search object image:
      feature amount extraction means for extracting a feature amount from the search object image;
      feature amount transformation means for transforming said extracted feature amount to adapt to said input search conditions; and
      determination means for determining whether or not said search object image is matched with the search conditions using said transformed feature amount after transformation,
   wherein said feature amount transformation means comprises coordinate transformation means for transforming coordinates of a noticed subject included in said extracted feature amount into coordinates in a coordinate system as defined by said search conditions,
   wherein said coordinate transformation means transforms a long-side coordinate interval of a long-side direction of the coordinate system for the search object image,
   wherein for a long-side coordinate interval that is within a predetermined range from a center of the coordinate system for the search object image, said coordinate transformation means transforms the long-side coordinate interval to be similar to a coordinate interval in a short-side direction,
   wherein for a long-side coordinate interval that is outside the predetermined range, said coordinate transformation means transforms the long-side coordinate interval to be wider than the coordinate interval in said short-side direction,
   wherein said determination means makes said determination by making greater a tolerance of determination near the periphery than at the center of the coordinate system,
   wherein a long-side coordinate interval that is near the periphery of the coordinate system is outside the predetermined range, and a long-side coordinate interval that is at the center of the coordinate system is within the predetermined range,
   wherein the long-side coordinate interval near the periphery of the coordinate system is transformed differently from the long-side coordinate interval at the center of the coordinate system, and
   wherein said determination means makes greater the tolerance of match determination near the periphery of the coordinate system in consideration of input errors of the search conditions near the periphery that are generated by transforming the long-side coordinate interval near the periphery to be wider than the coordinate interval in said short-side direction.

2. The image search apparatus as claimed in claim 1, wherein said coordinate transformation means makes the center of the coordinate system for said search object image coincide with the center of the coordinate system as defined by said search conditions in making said transformation.

3. The image search apparatus as claimed in claim 1, wherein said coordinate transformation means makes the end of the coordinate system for said search object image coincide with the end of the coordinate system as defined by said search conditions in making said transformation.

4. The image search apparatus as claimed in claim 1, wherein said search condition input means accepts the inputs of designating the position, size and inclination of the noticed subject.

5. An image search method for use in an image search apparatus, the method comprising:
   a search object image designation step of designating search object images;
   a search condition input step of inputting search conditions;
   for each designated search object image:
      a feature amount extraction step of extracting a feature amount from the search object image;

a feature amount transformation step of transforming said extracted feature amount to adapt to said input search conditions; and a determination step of determining whether or not said search object image is matched with the search conditions using said transformed feature amount after transformation, wherein said feature amount transformation step includes a coordinate transformation step of transforming coordinates of a noticed subject included in said extracted feature amount into coordinates in a coordinate system as defined by said search conditions, wherein said coordinate transformation step transforms a long-side coordinate interval of a long-side direction of the coordinate system for the search object image, wherein for a long-side coordinate interval that is within a predetermined range from a center of the coordinate system for the search object image, said coordinate transformation step transforms the long-side coordinate interval to be similar to a coordinate interval in a short-side direction, wherein for a long-side coordinate interval that is outside the predetermined range, said coordinate transformation step transforms the long-side coordinate interval to be wider than the coordinate interval in said short-side direction, wherein said determination step makes said determination by making greater a tolerance of determination near the periphery than at the center of the coordinate system, wherein a long-side coordinate interval that is near the periphery of the coordinate system is outside the predetermined range, and a long-side coordinate interval that is at the center of the coordinate system is within the predetermined range, wherein the long-side coordinate interval near the periphery of the coordinate system is transformed differently from the long-side coordinate interval at the center of the coordinate system, and wherein said determination step makes greater the tolerance of match determination near the periphery of the coordinate system in consideration of input errors of the search conditions near the periphery that are generated by transforming the long-side coordinate interval near the periphery to be wider than the coordinate interval in said short-side direction.

6. The image search method as claimed in claim 5, wherein said coordinate transformation step includes making the center of the coordinate system for said search object image coincide with the center of the coordinate system as defined by said search conditions in making said transformation.

7. The image search method as claimed in claim 5, wherein said coordinate transformation step includes making the end of the coordinate system for said search object image coincide with the end of the coordinate system as defined by said search conditions in making said transformation.

8. The image search method as claimed in claim 5, wherein said search condition input step includes accepting the inputs of designating the position, size and inclination of the noticed subject.

9. A non-transitory computer readable storage medium that retrievably stores a program for causing a computer to perform an image search method, the method comprising:

a search object image designation step of designating search object images;

a search condition input step of inputting search conditions;

for each designated search object image:

a feature amount extraction step of extracting a feature amount from the search object image;

a feature amount transformation step of transforming said extracted feature amount to adapt to said input search conditions; and a determination step of determining whether or not said search object image is matched with the search conditions using said transformed feature amount after transformation, wherein said feature amount transformation step includes a coordinate transformation step of transforming coordinates of a noticed subject included in said extracted feature amount into coordinates in a coordinate system as defined by said search conditions, wherein said coordinate transformation step transforms a long-side coordinate interval of a long-side direction of the coordinate system for the search object image, wherein for a long-side coordinate interval that is within a predetermined range from a center of the coordinate system for the search object image, said coordinate transformation step transforms the long-side coordinate interval to be similar to a coordinate interval in a short-side direction, wherein for a long-side coordinate interval that is outside the predetermined range, said coordinate transformation step transforms the long-side coordinate interval to be wider than the coordinate interval in said short-side direction, wherein said determination step makes said determination by making greater a tolerance of determination near the periphery than at the center of the coordinate system, wherein a long-side coordinate interval that is near the periphery of the coordinate system is outside the predetermined range, and a long-side coordinate interval that is at the center of the coordinate system is within the predetermined range, wherein the long-side coordinate interval near the periphery of the coordinate system is transformed differently from the long-side coordinate interval at the center of the coordinate system, and wherein said determination step makes greater the tolerance of match determination near the periphery of the coordinate system in consideration of input errors of the search conditions near the periphery that are generated by transforming the long-side coordinate interval near the periphery to be wider than the coordinate interval in said short-side direction.

* * * * *